United States Patent [19]
Kampfer et al.

[11] Patent Number: 5,868,987
[45] Date of Patent: Feb. 9, 1999

[54] SUPERIMPOSED EMBOSSING OF CAPPED STEM MECHANICAL FASTENER STRUCTURES

[75] Inventors: Robert D. Kampfer, Oakdale; Philip Miller, Eagan, both of Minn.

[73] Assignee: MinnesotaMining and Manufacturing, St. Paul, Minn.

[21] Appl. No.: 878,792

[22] Filed: Jun. 19, 1997

[51] Int. Cl.$^6$ .................................................. B29C 43/44
[52] U.S. Cl. ....................... 264/280; 264/210.2; 264/296; 24/442; 24/450; 24/452
[58] Field of Search ......................... 24/452, 451, 450, 24/449, 448, 447, 446, 445, 444, 442, 443; 264/280, 284, 293, 296, 210.2, 210.1

[56] References Cited

U.S. PATENT DOCUMENTS

| | | |
|---|---|---|
| 2,717,437 | 9/1955 | Mestral . |
| 3,009,235 | 11/1961 | Mestral ........................................ 28/78 |
| 3,027,595 | 4/1962 | Takai et al. ................................. 18/10 |
| 3,147,528 | 9/1964 | Erb ............................................ 24/204 |
| 3,192,589 | 7/1965 | Pearson ..................................... 24/204 |
| 3,408,705 | 11/1968 | Kayser et al. ............................. 24/204 |
| 3,557,407 | 1/1971 | Lemelson .................................. 18/10 |
| 3,594,863 | 7/1971 | Erb ............................................. 18/5 |
| 3,594,865 | 7/1971 | Erb ............................................. 18/5 |
| 3,629,032 | 12/1971 | Erb .......................................... 156/196 |
| 3,718,725 | 2/1973 | Hamano .................................. 264/163 |
| 3,762,000 | 10/1973 | Menzin et al. ............................. 24/204 |
| 4,056,593 | 11/1977 | De Navas Albareda ................ 264/145 |
| 4,290,174 | 9/1981 | Kalleberg .................................. 24/204 |
| 4,315,885 | 2/1982 | Lemelson ................................ 264/297 |
| 4,322,875 | 4/1982 | Brown et al. ............................. 24/204 |
| 4,454,183 | 6/1984 | Wollman .................................. 428/92 |
| 4,643,130 | 2/1987 | Sheath et al. ........................... 118/681 |
| 4,872,243 | 10/1989 | Fischer .................................... 24/442 |
| 4,984,339 | 1/1991 | Provost et al. ........................... 24/452 |
| 5,040,278 | 8/1991 | Eckhardt ............................. 29/243.53 |
| 5,058,247 | 10/1991 | Thomas et al. ........................... 24/448 |
| 5,077,870 | 1/1992 | Melbye et al. ............................ 24/452 |
| 5,256,231 | 10/1993 | Gorman et al. ........................ 156/178 |
| 5,260,015 | 11/1993 | Kennedy et al. ....................... 264/167 |
| 5,315,740 | 5/1994 | Provost ..................................... 24/452 |
| 5,339,499 | 8/1994 | Kennedy et al. ......................... 24/452 |
| 5,512,234 | 4/1996 | Takizawa et al. ..................... 264/511 |
| 5,607,635 | 3/1997 | Melbye et al. ........................ 264/169 |
| 5,671,512 | 9/1997 | Hattori et al. ............................ 24/452 |
| 5,713,111 | 2/1998 | Hattori et al. ............................ 24/452 |
| 5,775,015 | 5/1998 | Akeno et al. ............................. 24/452 |

FOREIGN PATENT DOCUMENTS

| | | |
|---|---|---|
| A-70529/96 | 3/1997 | Australia . |
| 0 271 210 A1 | 6/1988 | European Pat. Off. . |
| 0 276 970 A2 | 8/1988 | European Pat. Off. . |
| 0 324 577 | 7/1989 | European Pat. Off. . |
| 0 709 038 A2 | 5/1996 | European Pat. Off. . |
| 3244410 A1 | 12/1982 | Germany . |
| 0 771 537 A2 | 10/1996 | Japan . |
| 1 102 627 | 11/1965 | United Kingdom . |
| WO 82/02480 | 8/1982 | WIPO . |
| WO 87/06522 | 11/1987 | WIPO . |
| WO 94/23610 | 10/1994 | WIPO . |
| WO 98/14086 | 4/1998 | WIPO . |

OTHER PUBLICATIONS

Injection Molding Handbook, edited by Dominick V. Rosato et al., Van Nostrand Reinhold Co., New York; 1986; pp. 504–506, 596, 619–621, 753–756.

*Primary Examiner*—Jan H. Silbaugh
*Assistant Examiner*—Mark Eashoo
*Attorney, Agent, or Firm*—Gary L. Griswold; Robert W. Sprague; William J. Bond

[57] ABSTRACT

There is provided a method of capping mechanical fasteners from a web having an array of upstanding stems. A heated surface member is positioned opposite a support forming a nip into which the web is fed. The heated surface member has a series of laterally spaced elongated peak and valley structures such that more than one peak and valley structure contacts and deforms each stem structure. The peak and valley groove structures provided asymmetric elongation and deformation of top portion of the stem structures forming hook heads.

27 Claims, 4 Drawing Sheets

SUPERIMPOSED EMBOSSING OF CAPPED STEM MECHANICAL FASTENER STRUCTURES

BACKGROUND AND FIELD OF THE INVENTION

The present invention relates to a method and apparatus for capping upstanding stems to form mechanical fastener hooks. More particularly the invention relates to a method for forming asymmetrical capped hook shapes with greater uniformity and manufacturability.

Hook and loop mechanical fasteners are widely used for a vast array of products and applications. The methods for forming hook materials for use in these hook and loop type mechanical fasteners are widely varied. Over the years it has been found that hooks have different engagement mechanisms and characteristics with mating loop materials, depending on the hooks and/or the loop. This limits the practical applicability of any particular hook forming technique to producing hooks applicable for only certain types of uses or for use with only certain types of mated loop materials.

Some of the earliest hook materials were formed using the processes described in U.S. Pat. Nos. 2,717,437 and 3,009,235 in which special warps of upstanding nylon thread are cut so as to form open ended nylon hooks and nonfunctional upstanding stems. Hooks formed by these types of methods are large (e.g., about 2 mm) requiring the use of large open pile loop materials and have a rather low number of hooks per unit area. These hooks are also quite abrasive and therefore not well suited for uses where the hooks would likely contact sensitive skin. Hooks of this type are still in use today due to their durability in long term use. Similar types of hook structures are formed in accordance with the method of U.S. Pat. No. 3,594,865 in which a thermoplastic material is directly formed into a J-shaped "wire" hook by use of shallow J-shaped dies. These "wire dies" are formed into a continuous loop of mold material which mold passes through an extruder. The extruder forces molten plastic, such as nylon, into the wire dies while also impregnating a fabric web immediately beneath the wire die mold material. On exiting the extruder, excess thermoplastic resin is stripped from the surface of the wire die molds. The resilient hooks remain on the backing when the die is removed by essentially just pulling the now solidified hooks and backing away from the wire die mold material. U.S. Pat. No. 3,594,863 relates to a similar apparatus for producing a hook bearing strip. Both these patents state that the methods described can produce a wide variety of shapes. U.S. Pat. No. 3,594,865 states that the traditional method for directly injection molding a hook is limited to shapes which must taper from base to tip. However, the hook shapes formed by these patents are relatively large and the hooks must taper from the outer face to the opposing face along the length of the hook.

The traditional molded type of hook shapes referred to in U.S. Pat. No. 3,594,865 are like those described in U.S. Pat. Nos. 4,984,339 and 5,315,740. These patents disclose molded J-shaped hooks which have a profile defined by an inner smooth contoured, generally concave face and a generally convex shaped outer face. The hook tapers smoothly and continuously in width from the hook base to the hook free end. The hook allegedly is designed so that it will not deform to release a loop engaged with the hook in shear mode or at a desired applied force. The later patent discloses a similar hook which has a low displacement volume for the area defining the hook tip. This is described as desirable for use in applications such as disposable diapers and the like. Although these J-shaped hooks are generally adequately performing materials, they are extremely difficult to manufacture, particularly when very small hooks are made such as described in the '740 patent. Small complex shaped mold cavities are extremely difficult to manufacture and when forming extremely small hooks a proportionately larger number of J-shaped hook mold cavities must be formed. Small complex-shaped mold cavities are also much more susceptible to clogging and loss of mold cavity definition due to wear.

Extremely flexible and low cost methods for forming hooks of a wide variety of sizes and shapes are described in PCT Application Nos. WO 94/23610 and 92/04839 as well as U.S. Ser. No. 08/723,632. Using methods described in these patents and patent applications, a backing having a large number of upstanding thermoplastic stems is fed through a gap between a nip formed by, for example, two calender rolls. The upper nip is smooth and heated so that the distal ends or tips of the stems are deformed under heat and mechanical pressure, forming various types of cap structures depending on the nip conditions selected, the relative speed of the stems in the nip, and the size and shape of the stems. The undeformed stem portion and the formed cap together form a hook structure. The precursor material, a backing having upstanding undeformed thermoplastic stems, can be formed by molding techniques. However, the formation and use of mold cavities in the shape of upstanding stems is much simpler and less problematic than forming J-shaped hook molds. For example, these simple mold cavity shapes are much less likely to clog or adversely wear, depending on the selection of the mold materials. Further, it has been found that by using this method it is relatively easy to form large numbers of small closely spaced hooks per unit area, which is particularly desirable for engagement with relatively low loft woven or nonwoven loop materials. These low loft loop materials are generally also low cost making this hook structure extremely desirable for low cost limited use applications such as disposable garments. Also advantageous is the tactile feel of these hook materials. Due to the high density of hooks and/or the hooks having a relatively flat or planar upper surface, the hooks are extremely skin friendly, non-abrasive and have a film-like texture. The preferred hook materials are essentially not even discernible as having hooks with casual skin contact. This also makes the hooks useful for disposable garments used close to the skin (e.g., diapers or surgical gowns). The present invention is directed at a method for improving the above method of hook formation and the hooks formed thereby.

BRIEF SUMMARY OF THE INVENTION

In the method of forming capped stem mechanical fasteners of the present invention, there is provided a precursor web material having an array of upstanding thermoplastic stems projecting distally from at least one surface of the web backing. The upstanding stems are generally of a substantially constant width along the stem length or may taper from base to tip. A heated surface member is positioned opposite a support surface member to form a nip, which preferably extends across the width of the web or backing surface having the upstanding stems and also along the length of the web for a given distance forming a compression zone. The precursor web is fed into the nip, which forms a gap. The gap tapers from a given initial width in the compression zone. The stem tips are initially engaged at a given entry gap width and are compressed in the nip to a given end gap width. In this compression zone, the nip progressively engages and compresses the polymeric stems between the heated nip surface member and the support surface member. Although this compression is preferably continuous, it can be intermittent and/or at different compression rates in the compression zone determined by the gap width. This heat and compression causes the distal ends of the thermoplastic upstanding stems to deform into cap structures capable of engaging a fibrous loop material.

At least in a portion of the compression zone, the surface of the heated nip member is provided with at least one series or set of laterally spaced elongated peak and valley (groove) structures where the average peak to valley depth is generally from 5 to 500 microns, preferably 10 to 200 microns, most preferably 15 to 150 microns. The average spacing of adjacent peak structures is less than the average width of the stem base immediately adjacent the stem end portions prior to being deformed by the nip. Preferably, the peak structures are spaced so that each stem end portion contacts at least two, preferably at least four, laterally spaced peak structures while being deformed. A given set of laterally spaced peak and valley structures preferably longitudinally extends for a distance at least equal to the average distance between adjacent upstanding stem members (average nearest neighbor distance in at least two directions) and preferably continuously along the length of the heated nip member in the compression zone. Similarly sufficient peak and valley structures are provided in a given set so that adjacent peak and valley structures of the set extend laterally at least for a distance equal to the average distance between adjacent upstanding stem members (average nearest neighbor distance in at least two directions). The peak and valley structures on the heated nip member provide for capped stem hooks having substantially enhanced directionality and, depending on the structure, more uniformity of hook head shape across the length and width of the web without any loss in functionality and generally increased engageability of the formed capped hooks with both high and low loft nonwoven loop materials.

The present invention is also directed to an apparatus for capping a precursor web provided with an upstanding array of thermoplastic stems projecting from a web backing. The apparatus includes a heated surface member opposite a support surface member forming a nip, which nip preferably substantially continuously tapers from an entry gap width to an end gap width defining a compression zone. A feed means is provided for feeding a precursor web into and through the nip. The heated surface member of the nip is provided with peak and valley structures as above at least in a portion of the compression zone.

Although the nip gap width preferably continuously decreases in the compression zone, the nip may have a generally constant gap width along at least a portion of its length or the gap width may decrease and increase intermittently or decrease at different rates, or combinations of the above. Generally, the nip compression zone is defined by a first entry gap width and a second gap, preferably less than the first gap width, defining a nip end gap. The given nip entry gap width is defined by the thickness of the backing substrate web and average height of the upstanding stems at the point at which the precursor web material stem tips first compressively engages the heated upper surface defining the nip. The end gap width is the narrowest gap width in the nip after which point the web and deformed stem tips or end portions substantially disengage compressively with the heated nip surface member.

The invention method and apparatus enables the formation of the distal ends of the thermoplastic stems into a wide variety of asymmetric cap shapes oriented in any given direction, including asymmetric mushroom-shaped heads, elongated J-shaped hooks, T-shaped hooks and the like while still maintaining all of the advantages described in the prior art methods for forming capped stem mechanical fastener hooks.

DETAILED DESCRIPTION OF THE PREFERRED EMBODIMENTS

Figure 1:
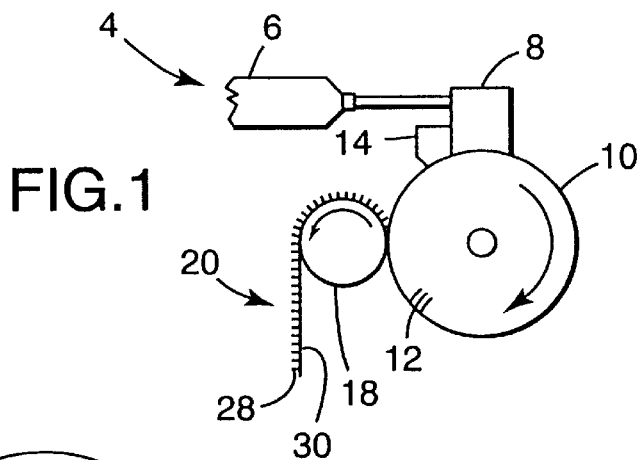
FIG. 1 is a schematic illustration of a method for making the strip of material having upstanding stems for making the invention capped stem fasteners.

The invention method relates to forming headed or capped stem mechanical fasteners for use in a hook and loop type mechanical fastener systems or mated self-engaging mechanical fasteners.

The invention is initially directed at a method for capping hook heads on a backing comprising at least the following steps.

First, a web is provided which is a web backing with an array of substantially upstanding projections. The projections are formed by a substantially upstanding stem base portion and a stem end portion or hook head. Overall, the web has a first average thickness.

Also provided is a nip having at least one first heated surface member and at least one second opposing surface member. The nip has a gap which gap has a compression zone defined by a first entry gap width and a second end gap width. The first gap width is substantially equal to or less than the web first average thickness. The second end gap width is less than the first web thickness and is the smallest gap width of the nip. The at least one heated surface member is provided with at least one set of peaks and groove structures longitudinally extending in at least one first direction in the compression zone. The average spacing between adjacent peak structures is generally less than the average width of the stem base portion immediately adjacent a stem end portion or a hook head. Also, the at least one set of peak and groove structures generally extends longitudinally for a distance at least equal to the average distance between adjacent upstanding stem base portions.

The web is then moved along a web path into and through the compression zone in a second direction, such that at least a portion of the array of substantially upstanding projections are preferentially deformed by the heated surface member in the at least first direction defined by the at least one set of peak and groove structures.

The first direction can be substantially parallel with the second direction in which case the relative speed of the heated surface member and the web can be the same or different and the hook heads formed or modified by the heated surface member are provided with an orientation in the direction of web travel. If the first direction and second direction are substantially different, the relative speed of the heated surface member and the web are generally substantially the same. Similarly, if more than one set of peak and groove structures are provided on the same heated surface member, which sets of structure are oriented at substantially different directions, then the heated surface member should travel at the same relative speed as the web.

The capped or headed stem hook fasteners can be formed using a backing material having an array of upstanding plastically deformable, thermoplastic stems. These upstanding stems are preferably formed on an integral backing of the same thermoplastic material. Suitable thermoplastic materials include polyolefins such as polypropylenes or polyethylenes, polyamides such as nylon, polyesters such as poly(ethylene terephthalate), plasticized polyvinyl chloride, copolymers and blends thereof, optionally, with other polymers or plasticizers, or the like.

A suitable method for forming this precursor material of a web backing having an array of upstanding projections is shown in FIG. 1. A feed stream 4 of preselected thermoplastic resin is fed by conventional means into an extruder 6 which melts the resin and moves the heated resin to a die 8. The die 8 extrudes the resin as a wide ribbon of material onto a mold surface 10, e.g., a cylinder, having an array of mold cavities 12 in the form of elongated holes, which preferably taper to facilitate removal of the solidified resin from the mold cavities. These holes or mold cavities are preferably in the form of straight (i.e., only one axis in the length direction) cavities. The mold cavities can be connected to a vacuum system (not shown) to facilitate resin flow into the mold cavities. This could require a doctor blade or knife to remove excess material extruded into the interior face of the mold cylinder. The mold cavities 12 preferably terminate in the mold surface having an open end for entry of the liquid resin and a closed end. In this case, a vacuum 14 could be used to at least partially evacuate the mold cavities 12 prior to entering the die 8. The mold surface 10 preferably matches that of the die 8 where they are in contact to prevent excess resin being extruded out, e.g., the die side edges. The mold surface and cavities can be air or water cooled, or the like, prior to stripping the integrally formed backing and upstanding formed stems from the mold surface such as by a stripper roll 18. This provides a web 20 of a backing 30 having integrally formed upstanding stems 28 of thermoplastic material. Alternatively, upstanding stems could be formed on a preformed backing or the like by extrusion molding or other known techniques.

Figure 2:
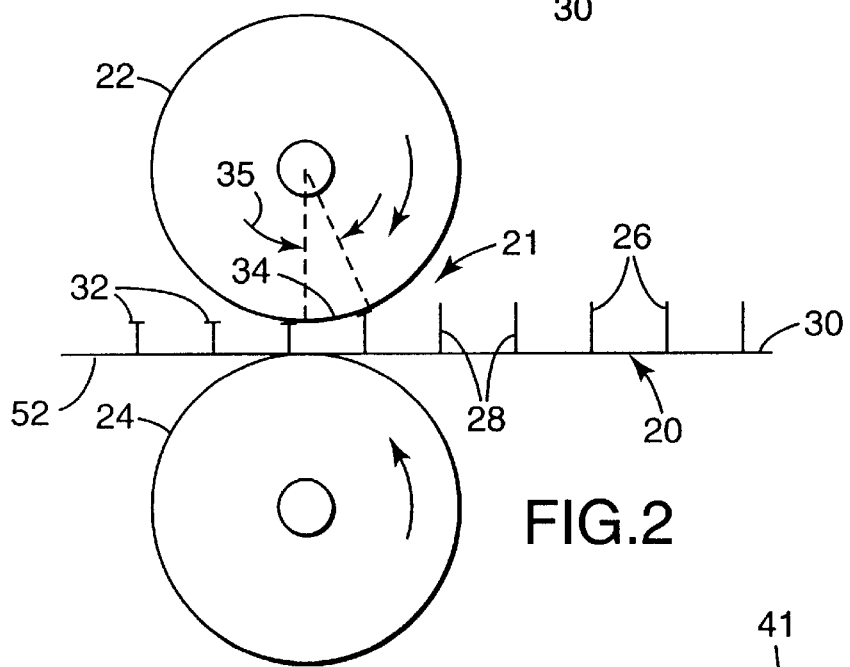
FIG. 2 is a schematic illustration of a method for capping using a calendering system.

The stems formed by the method of FIG. 1, or like methods, can be capped by use of a heated nip which can be formed by two calender rolls, 22 and 24, as shown in FIG. 2. The heated calender roll 22 contacts a predetermined portion of a distal end 26 of the stems 28 projecting upward from the backing 30. The roll temperature will be that which will readily deform the distal ends 26 under pressure created by the nips in the compression zone 35 without causing resin to stick to the roll 22 surface. The roll 22 surface can be treated with release coatings resistant to high temperature to allow for higher temperatures and/or longer contact times between the stem tips or distal ends 26 and the heated roll 22.

Figure 3C:
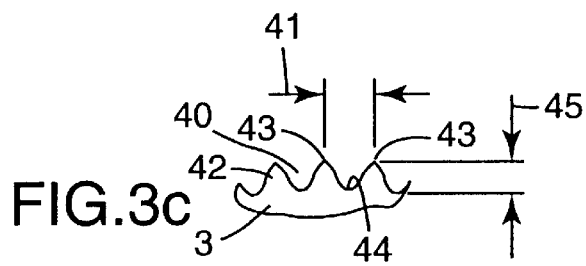
FIG. 3a and 3b are schematic illustrations of the orientation of capping surface peak and valley microstructures such as shown in FIG. 3c, on a calender roll.

In the invention method, the surface of the, e.g., heated roll 22 is provided with a series of valleys or grooves 40 and separating peaks 42, the width of the grooves 41 is defined by the peaks 42, or edge regions 43 of the peaks 42, which also define the groove depth 45 with the groove 40 low point 44. As shown in FIG. 3c, the peaks 42 can have a defined apex, however, the tops of the peaks could also be flat, curved or even have further microstructure. Similarly, the grooves are shown as generally V-shaped, but they can be other shapes such as U-shaped, rectangular, W-shaped, or other shapes. Sets of peaks and grooves can extend continuously or intermittently in either the transverse direction (FIG. 3a) or the longitudinal direction (FIG. 3b) or at some intermediate angle or various sets of peaks and grooves could extend in different directions. The average depth 45 of the grooves 40 is generally from 5 to 500 microns, preferably from 10 to 200. Generally, the groove depth should be sufficient to direct the flow of heat softened resin of the distal end 26. The average groove width 41 is preferably less than the average width of the stem 28 distal ends 26. Generally, the average groove width 41 is such that the distal end 26 contacts from 2 to 40 grooves, preferably 4 to 20 grooves while being deformed. The groove depth and width is preferably uniform, however, could vary significantly if desired. For example, a groove could either increase or decrease in depth along the length of the grooves. Preferably, the minimum groove depth is at least 15 microns.

Similarly, the peaks are of a substantially uniform height. However, the peak heights could vary or in certain cases, secondary cross-directional or other grooves could be used on one or more peaks. Secondary cross grooves could be useful in providing more complex flow patterns during the capping process and/or more evenly distribute resin between adjacent primary grooves. The primary grooves provide directional flow or deformation of the heat softened stem top portion in the nip 21, forming a more asymmetrical head 32 from the deformed distal end 26 of the stem. The increased asymmetrical nature of these capped heads (reduction in the number of planes of symmetry) provide for improved engageability with most fibrous loop materials. Generally, this is accomplished by increasing the overhang of the head without corresponding increases in the overall cross-sectional area of the head top, flat or planar portion. With the prior methods, using a smooth heated surface member in the nip, any increases in overhang beyond the stem of the cap head also proportionally increased the cap top flat planar portion reducing penetration into loop materials.

This improved asymmetrical nature is particularly advantageous in providing hooks with overhang on two opposing sides of a given stem. The capped heads can also easily be oriented in any given direction or a multiplicity of directions, a highly advantageous feature and either not obtainable or obtainable only with great difficulty with the prior art methods. The capping method of the invention can also be used to provide increased directionality or overhang for hook fasteners with previously formed hook heads. These hook heads can be formed by a capping process or other known techniques such as molding. The only requirement is that the hooks are formed on a substantially upstanding stem as defined below. In this case, the average spacing between adjacent peaks is less than the width of the hook head in the direction perpendicular to the length direction of the peaks and grooves.

Figure 6:
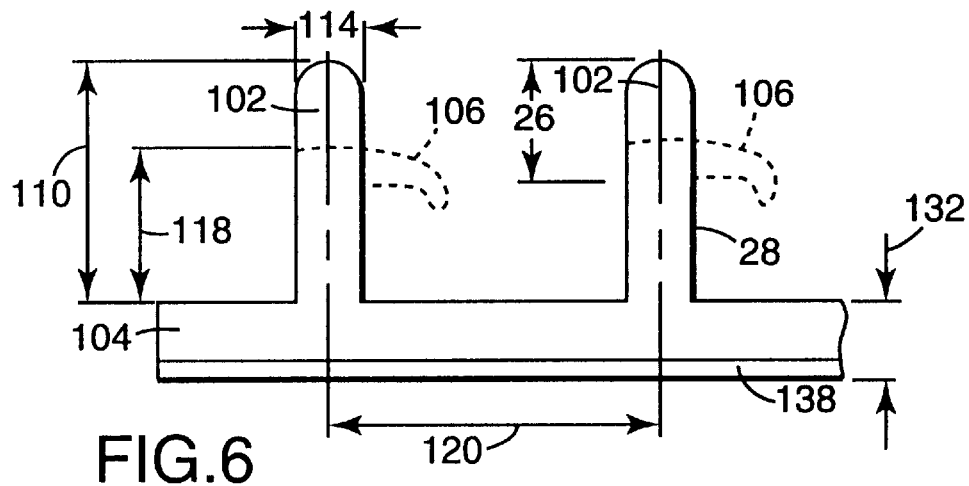
FIG. 6 is a side view of a stem containing backing material used in the present invention method.
Figure 7:
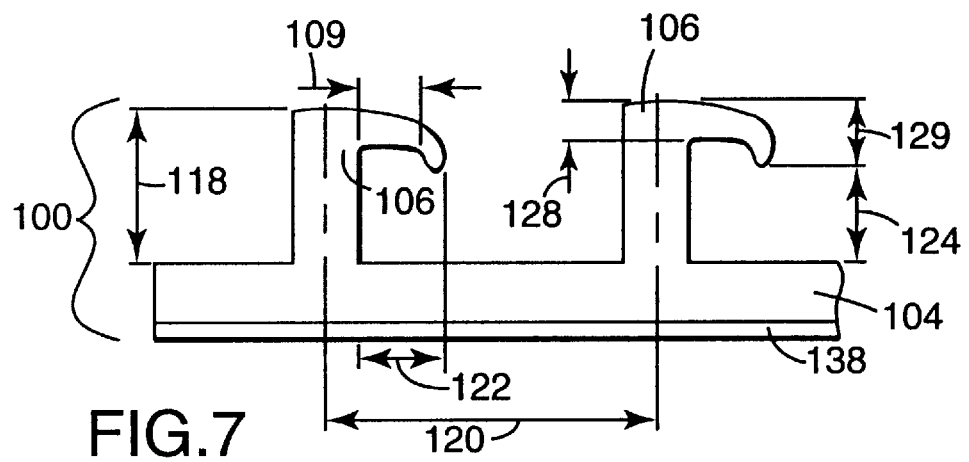
FIG. 7 is a side view of a headed stem fastener such as produced by the invention method.

The invention process can readily form capped heads into J-shapes such as disclosed in copending U.S. application Ser. No. 08/723,632, as shown in FIGS. 6 and 7. In this method, the J-shaped hook 106 dimensions include a precursor stem 28 height 110, stem diameter 114, final hook height 118, the distance between hooks 120, hook opening width 122, hook opening height 124, hook head thickness 128 at the base of the hook head 106, hook head height 129, hook overhang 109 as well as the overall surface area of the planar top portions of the hooks. The stem distal end portion is shown as 26 with the remainder of the stem comprising an undeformed stem base portion. The film caliper or backing thickness 132 further defines the hook strip. The same dimensions can be found in other hook head shapes including mushrooms shapes, umbrella shapes, T-shapes or the like. In forming a mushroom, umbrella, T-shape or the like the relative speed of roll 22 substantially matches that of web 30. To form J-shaped hooks, the backing or web 30 is moving at a different speed than the, e.g., heated roll 22 (i.e., either faster or slower or even in opposite directions).

Figure 4:
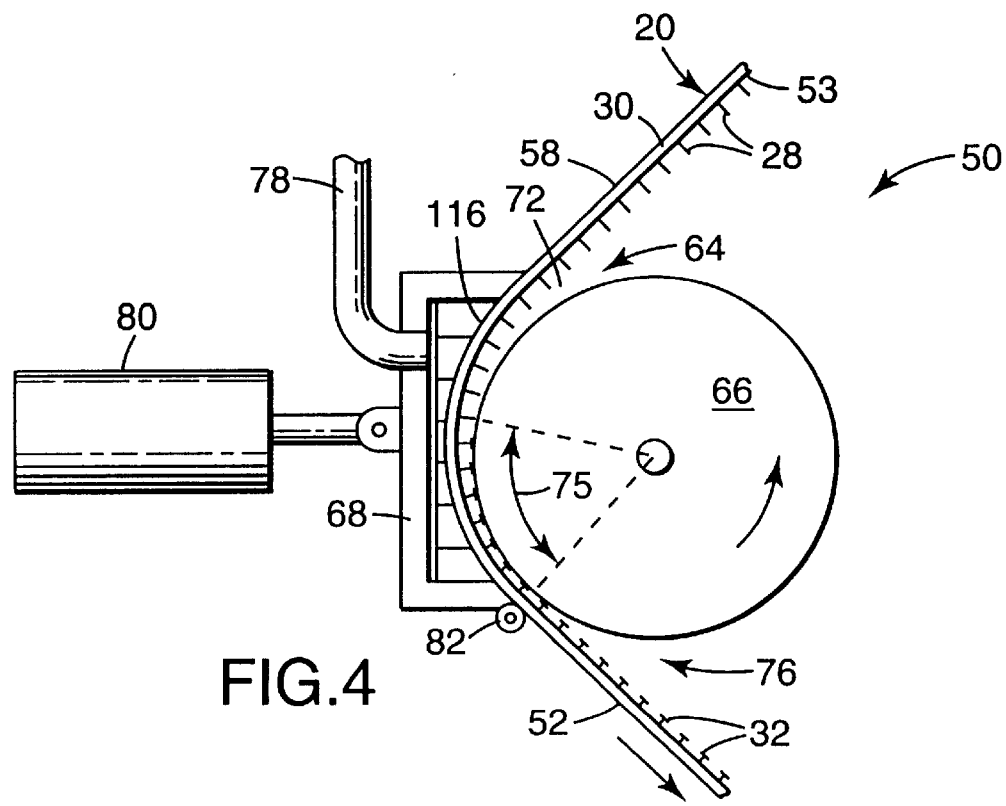
FIG. 4 is a schematic illustration of an alternative apparatus for forming headed stem fasteners in accordance with the invention.

Alternative methods (e.g., FIGS. 4 and 5) for producing the capped stem fasteners of the invention are disclosed in copending U.S. application Ser. No. 08/781,783. In the method and apparatus of FIG. 4, a capping apparatus 50 is used to form a capped stem fastener 52 having a plurality of generally uniform hooks 32. A precursor web 20 having a backing 30 with a rear surface 58 and a multiplicity of polymeric stems 28 projecting distally from a front surface 53 is directed into a nip inlet 64. The nip inlet 64 is formed between a heated roll 66 and a curved support structure 68. The curved support structure 68 preferably has a shape generally corresponding to that of the heated roll 66 at a slightly larger radius of curvature. Piston 80 provides a compressive force between the curved support structure 68 and the heated roll 66.

The nip 64 defines a first entry gap width at a nip inlet 72 and a second end gap width at a nip outlet 76 defining a compression zone 75. The second end gap width is preferably less than the first gap width. In the preferred embodiment, the nip 64 gap width decreases continuously at a substantially linear rate of change at least at some region. Preferably, this substantially linear rate of change in the gap width is at least in a region immediately adjacent the nip inlet entry gap width between the nip inlet 72 and nip outlet 76. In an alternate embodiment (not shown), the nip 64 may decrease to a minimum value at some intermediate location between the nip inlet 72 and outlet 76 or decrease then increase then decrease, again, etc.

A fluid, such as air or water, may be introduced through pipe 78 to the interface between the rear surface 58 of the backing 30 and the surface 116 to create a fluid bearing. The surface 116 may optionally be coated with a low surface energy material such as polytetrafluoroethylene (PTFE) or ultra high molecular weight polyethylene. Without the air bearing, the backing 30 tends to wrinkle as it enters the nip 64, potentially causing tears in the backing 30. A piston 80 is provided for positioning the curved support structure 68 relative to the heated roll 66. The curved support structure 68 may also pivot along a pivot point 82 to further adjust the nip 64 gap width in the compression zone 75.

The relative speed of the heated roll 66 and the line speed of the precursor web 20 determines the overall shape of the capped stem hooks 32 on the capped stem fastener 52. The rate of rotation of the heated roll 66 may be greater than, less than or equal to the line speed of the precursor web 20. For some applications, the roll 66 may be stationary while the precursor web 20 moves through the nip. Alternatively, the roll 66 may be rotated in a direction opposite the direction of movement of the precursor web 20.

Figure 5:
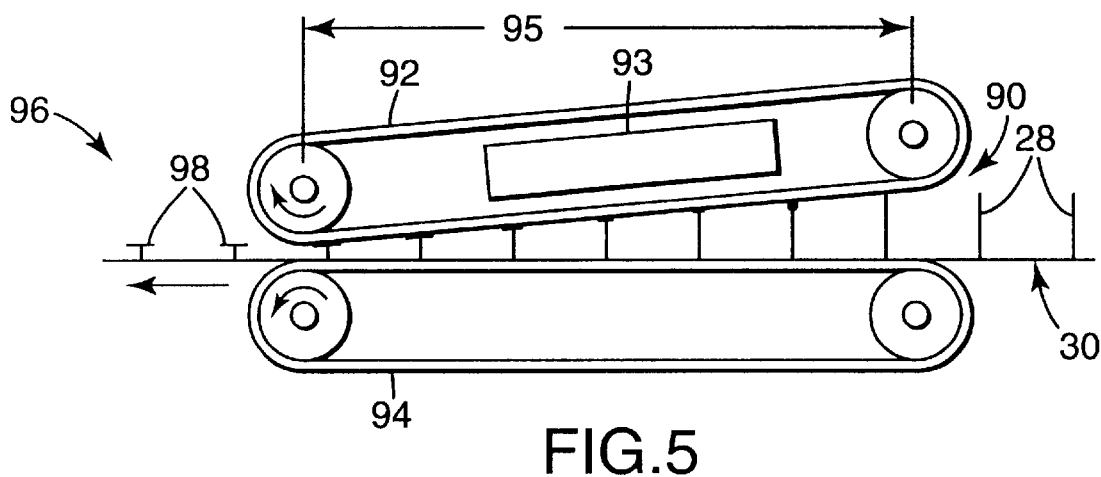
FIG. 5 is a schematic illustration of an alternative apparatus for forming headed stem fasteners in accordance with the invention.

FIG. 5 is an alternate embodiment of a method and apparatus for forming capped stem fasteners 96. Opposing belts 92 and 94 have elongated portions defining a nip 90. Heat source 93 maintains belt 92 at the desired temperature. The heated belt 92 is angled with respect to the belt 94 to form a continuously decreasing nip 90. The precursor web 20 is fed into the nip 90, where the stems 28 are compressively engaged between the opposing belts 92 and 94 in the compression zone 95. The heat and mechanical force deforms the stems 28 to form a headed stem fastener 96 with a plurality of capped stem hooks 98.

Movement of the belts 92 and 94 is preferably synchronized so that the relative line speed of the belts 92 and 94 is generally the same. Synchronous movement of the belts 92 and 94 is preferred to form more symmetrical capped stem hook heads 98 about the stem (i.e., generally symmetrical about two or more planes of reflection). However, perfectly symmetrical capped heads (i.e., circular mushroom caps) are not obtained. Alternatively, the relative movement of the belts 92 and 94 can be slightly asynchronous to achieve asymmetrical capped heads 98 about the stem (i.e., with one or less planes of reflection), such as J-shaped hooks. It will be understood that a stationary support structure can be substituted for the belt 94, in which event the support structure preferably includes a low friction surface, such as the air bearing discussed above.

Figure 8:
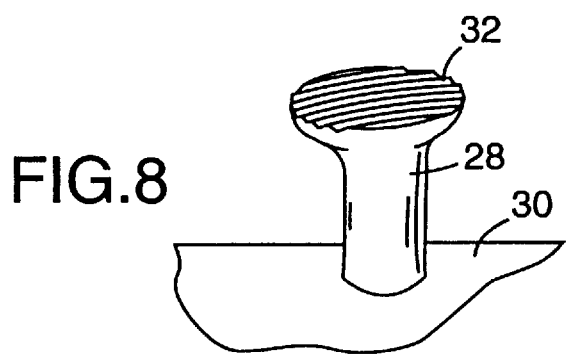
FIG. 8 is a perspective view of a headed stem fastener produced by the invention method.
Figure 9:
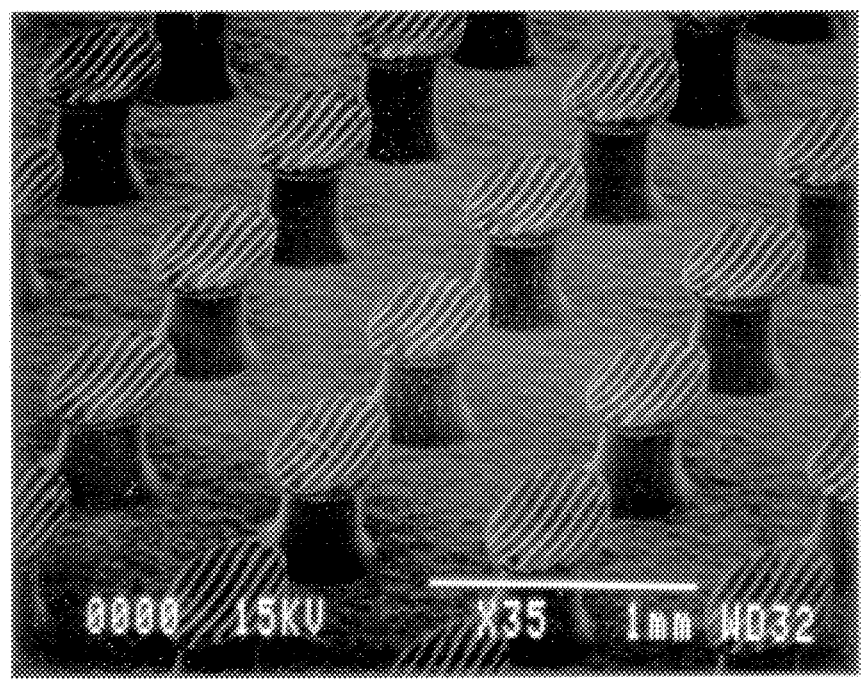
FIG. 9 is an optical photograph of a headed stem fastener produced by the invention method.

The specific shape and orientation of the capped heads of the hooks 32 are determined by the relative size, spacing and orientation of the peaks and grooves on the heated surface member, the relative speeds of the web 20 and the heated surface member, as well as the temperature and shape of the heated surface member and gap formed and the length of the compression zone. The grooves preferably are continuous and uniform across the heated surface member. The grooves can be orientated in the machine direction or orientated in the direction of web movement through the nip in the compression zone, such as shown in FIG. 3b for a roll. This results in a capped stem head which is longer in the machine direction than the cross direction. The resulting shape is generally such as shown in the FIG. 8 schematic drawing.

When using a groove that is orientated in the direction of web movement, if the groove depth varies in the machine direction, symmetrical type capped heads will have different degrees of elongation and asymmetrical type capped heads will have shallower groove depths generally corresponding to the shallowest groove depth. The symmetrical type capped heads will have different elongation or aspect ratios that depend on the groove depth where the stem is contacted. With asymmetrical type capped heads, the web and the heated surface are moving at different speeds causing the shallower groove areas to overall even out the groove depth.

Figure 3A:
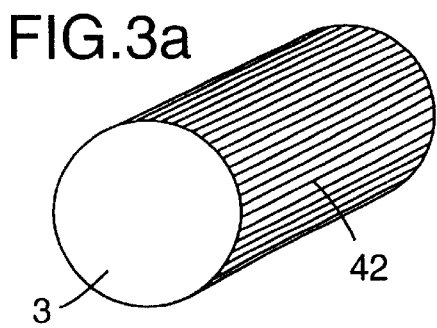
Figure 3B:
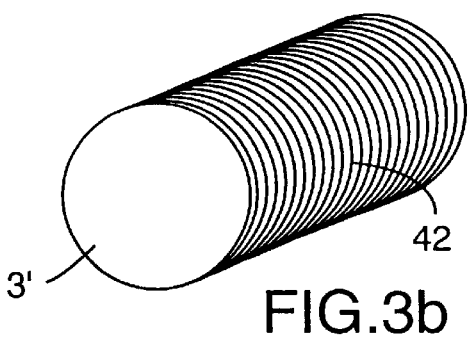

It is also possible to angle the orientation of the grooves on a heated surface member relative to the machine direction or direction of web movement (such as shown in FIG. 3a for a roll) or provide sets of peaks and grooves of different orientation on the same heated surface member or different heated surface members. Where the peaks and grooves are angled relative to the machine direction, the resulting capped heads can be provided with elongated axes at angles relative to the web longitudinal direction, a feature not possible with the prior art methods using smooth heated surface roll without complex manufacturing techniques. However, when peaks and grooves are angled relative to the machine direction, the relative speeds of the web and the heated surface member should be substantially matched to prevent the peaks from rasping or scraping the stems. The angle of the sets of peaks and grooves relative to the machine direction can range from greater than zero up to 180 degrees which angle could also vary such as with grooves that are nonlinear such as curved, circular, and the like.

It is also possible to provide peaks and grooves only over a portion of the compression zone, which could be done by use of more than one heated surface member to form multiple compression zones or a single heated surface with a compression zone with peaks and grooves over only a portion of the compression zone. In order to ensure that each stem encounters at least a portion of the compression zone with peaks and grooves, the surface member should be stationery or moving at a rate that ensures stem contact with at least one portion having peaks and grooves. In this manner, ridges or grooves formed on the capped stems could be subsequently smoothed out or eliminated, if desired, by a smooth heated surface member or region following a peak and valley structured heated surface member or region.

Overall, the capped stem fastener hooks are in the shape of a substantially upstanding stem base portion at an angle of about 90 degrees from the backing substrate, however, this angle can range from 80 to 100 degrees, preferably 85 to 95 degrees. The capped head is formed from a distal end portion 26 of the stem and has a generally flat and planar upper surface generally having at least one thin region or groove (formed by the heated surface member peaks), and preferably 2 to 40 thin regions or grooves and most preferably 4 to 20 thin regions or grooves. The capped heads are elongated in the direction of the thin regions or grooves such that the heads have a length-to-width aspect ratio of at least about 1.1:1, preferably at least 1.4:1 and most preferably 1.5:1 taken in the direction of the grooves. The generally flat or planar upper surface is well suited for engaging relatively open woven and nonwoven loop products such as used in disposable or limited use garments. This flat or planar upper surface is also non-abrasive and tactually smooth to the skin unlike molded hooks which generally have a distinct apex (e.g., on the hook slopes away from a peak in at least two directions). Apexed hook fasteners are less skin friendly, making them less well suited for use in connection with sensitive skin (e.g., on a baby diaper).

For use on diapers and like garments, the capped stem hooks are of uniform height, preferably from about 0.10 to 1.3 mm in height, and more preferably from about 0.2 to 0.5 mm in height. The capped stem hooks have a density on the backing preferably of from 60 to 1,600 hooks per square centimeter, and more preferably from about 100 to 700 hooks per square centimeter. The stem base portions have a diameter adjacent the heads of the capped stem hooks, preferably from 0.07 to 0.7 mm, and more preferably from about 0.1 to 0.3 mm. The capped heads project radially past the stem base portions on at least one side preferably by, on average, about 0.01 to 0.3 mm, and more preferably by, on average, about 0.02 to 0.25 mm and have average thicknesses between their outer and inner surfaces (i.e., measured in a direction parallel to the axis of the stems) preferably from about 0.01 to 0.3 mm and more preferably from about 0.02 to 0.1 mm. The capped heads have an average diameter (i.e., measured radially of the axis of the capped heads and the stems) to average capped head thickness ratio preferably from 1.5:1 to 12:1, and more preferably from 2.5:1 to 6:1. To have both good flexibility and strength, the backing of the capped stem fastener preferably is a film from 0.02 to 0.5 mm thick, and more preferably is from 0.06 to 0.3 mm thick, especially when the fastener is made of polypropylene or a copolymer of propylene and ethylene. For some uses, a stiffer backing could be used, or the backing can be coated with a layer of pressure-sensitive adhesive on its surface opposite the surface with the capped stem hooks by which the backing could be adhered to a substrate.

For most hook-and-loop uses, the capped stem hooks of the capped stem fasteners should be distributed substantially uniformly over the entire surface area of the capped stem fastener, usually in a square, staggered or hexagonal array. For hermaphroditic uses, the capped stem hooks preferably are distributed to prevent lateral slippage when engaged.

The invention capped stem fasteners can be produced in long, wide webs that can be wound up as rolls for convenient storage and shipment. The capped stem fastener material in such rolls can have a layer of pressure-sensitive adhesive on the surface of the backing opposite that with the capped stem hooks which adhesive can releasably adhere to the heads of the capped stem hooks on underlying wraps of the capped stem fastener material in the roll. These rolls do not require a release liner to protect the layer of pressure-sensitive adhesive in the roll. The limited area of the heads to which the pressure-sensitive adhesive is adhered in the roll maintains the capped stem fastener material in a stable roll form until it is ready for use, and then allows the fastener material to be easily unwound from the roll. Pieces of desired lengths of capped stem fasteners can be cut from the roll of fastener material and adhesively or otherwise secured to articles such as a flap of a garment to permit the flap to be releasably fastened.

Test Methods

135 Degree Peel Test

The 135 degree peel test was used to measure the amount of force that was required to peel a sample of the headed stem mechanical fastener material from a sample of loop fastener material.

A 2 inch×5 inch (5.08 cm×12.7 cm) piece of a loop test material was securely placed on a 2 inch×5 inch (5.08×12.7 cm) steel panel by using a double-coated adhesive tape. The loop material was placed onto the panel with the cross direction of the loop material parallel to the long dimension of the panel. A 1 inch×5 inch (2.54 cm×12.7 cm) strip of the mechanical fastener to be tested was cut and a mark was placed 1 inch (2.54 cm) from both ends of the mechanical fastener strip. The hook strip was then centrally placed on the loop so that there was a 1 inch×1 inch (2.54 cm×2.54 cm) contact area between the strip and the loop material and the leading edge of the strip was along the length of the panel. The strip and loop material laminate was then rolled by hand, once in each direction, using a 4.5 lb (1000 gram) roller at a rate of approximately 12 inch (30.5 cm) per minute. Paper was used between the nonengaging regions of the strip and the loop material to ensure a maximum 1 inch (2.54 cm) engagement. Holding the leading edge of the strip the laminate was sheared slightly by hand approximately ⅛ inch (0.32 cm), engaging the hook elements of the strip into the loops. The sample was then placed in a 135 degree peel jig. The jig was placed into the bottom jaw of an Instron™ Model 1122 tensile tester. Without pre-peeling the sample, the leading edge was placed in the upper jaw with the 1 inch mark at the bottom edge of the jaw. At a crosshead speed of 12 inch (30.5 cm) per minute, a chart recorder set at a chart speed of 20 inch (50.8 cm) per minute was used to record the peel which was maintained at 135 degrees. An average of the four highest peaks was recorded in grams. The force required to remove the mechanical fastener strip from the loop material was reported in grams/2.54 cm-width. Reported values are an average of at least five tests.

135 Degree Twist Peel Test

The 135 degree twist peel test was carried out in a manner similar to the 135 Degree Peel Test except that the sample preparation was different. After the mechanical fastener strip was placed on top of the loop material on the panel, a 9 lb (4 kg) weight was placed on top of the laminate. Then the weight was twisted approximately 0.5 inch (1.3 cm) in one direction, then 0.5 inch (1.3 cm) in the opposite direction. This was done two times for a total of four twists. The twist peel test was then carried out as described above for the 135 degree peel test.

EXAMPLES

Example 1

A precursor web material having an array of upstanding thermoplastic stems was prepared in a manner similar to that described for the Example in PCT application no. WO 94/23610. The stem density was 900 stems/inch$^2$ (139 stems/cm$^2$). The height of the stems was 25 mils (0.63 mm) and the width or diameter of the stems was 11 mils (0.28 mm). The web backing thickness was 4.5 mils (113 microns). The precursor web was prepared from an ethylene-propylene impact copolymer resin (#SRD7-560, available from Union Carbide).

The precursor web was fed through a nip formed by two calender rolls. The surface of the top roll, which contacted the distal ends or tips of the stems, had a pattern of peak and valley (groove) structures (See FIG. 3c.). The grooves were approximately 1 mil (0.025 mm) deep and were spaced 2 mils (0.051 mm) apart. The grooves were oriented in the machine direction (i.e. parallel to the circumferential direction of the roll. See FIG. 3b.). The temperature of the top roll was set at 140° C., and the temperature of the bottom roll, which contacted the web backing, was set at 16° C. The nip gap was 10 mils (0.25 mm) and the precursor web was fed through the nip one time. The piston pressure holding the calender rolls together was sufficient to compress the melt zone. The line speed was 3 meters/minute. The resulting capped stem hooks were elongated in the machine direction. The diameter of the cap in the machine direction was 24 mil (0.61 mm) whereas the diameter of the cap in the cross direction was 15 mil (0.38 mm). The height of the capped stems was 16 mils (0.4 mm). The elongated capped stem fasteners were then tested for 135 degree peel. For comparative purposes, a round "mushroom" type capped stem fastener with 900 stems/inch$^2$ (139 stems/cm$^2$), available from 3M Company as XMH-4152, was also tested. The loop material used for testing was a knitted loop material designated KN-0568 available from 3M Company. For the elongated capped stem hook fastener the peel test was carried out such that the peel front was perpendicular to the long axis of the caps. The 135 degree peel values for the elongated capped stem fastener averaged 259 grams/2.54 cm-width. The 135 degree peel values for the round capped stem fasteners averaged 139 grams/2.54 cm-width.

Example 2

The same precursor web that was used for Example 1 was used for the preparation of Example 2. The precursor web was feed through a nip formed by two calender rolls where the surface of the top roll, which contacted the distal ends or tips of the stems, had a pattern of peak and valley (groove) structures where the grooves were oriented in the cross direction (i.e. parallel to the roll face. See FIG. 3a.). The grooves were approximately 1 mil (0.025 mm) deep and were spaced 2 mils (0.051 mm) apart. The temperature of the top roll was maintained at 141° C. (as measured with a contact thermocouple) and the bottom roll was chilled to 17° C. (as measured with a contact thermocouple). The precursor web was fed through the nip three times. For the first pass the nip gap was 18 mils (0.46 mm); for the second pass the nip gap was 15 mils (0.38 mm); for the third pass the nip gap was 12 mils (0.3 mm). The piston pressure holding the calender rolls together was sufficient to compress the melt zone. The line speed was approximately 14 meters/minute. The resulting capped stem hooks were elongated in the cross direction. The average diameter of the capped heads in the cross direction was 23 mils (0.58 mm) whereas the average diameter of the capped heads in the machine direction was 14 mils (0.36 mm). The average height of the capped stems was 19 mils (0.48 mm).

The elongated capped stem fasteners were tested for 135 degree twist peel. The peel test was carried out such that the peel front was perpendicular to the long axis of the capped heads. The loop material used for peel testing was a nonwoven loop material that was similar to that described as Example 1 in U.S. Pat. No. 5,256,231. The twist peel test was carried out such that the peel front was parallel with the bond lines of the loop material. The 135 degree twist peel values for the elongated capped stem hook fastener averaged 775 grams/2.54 cm-width. For comparative purposes, round "mushroom" type capped stem hook fasteners were also tested. The 135 degree twist peel values for the round capped stem hook fasteners averaged 354 grams/2.54 cm-width.

Examples 3 through 9

Examples 3 through 9 were prepared to demonstrate how peel values are affected by the directionality of the caps of the elongated capped stem hook fastener. An elongated capped stem hook fastener web was prepared in a manner similar to that described for Example 2 (caps oriented in the cross direction). Samples of the hook fastener were cut out of the web at angles of 0°, 15°, 30°, 45°, 60°, 75°, and 90° (0° was parallel to the long axis of the cap; 90° was parallel to the short axis of the cap or perpendicular to the long axis of the cap) and were tested for 135 degree twist peel. The loop material used for twist peel testing was a nonwoven loop material that was prepared in a manner similar to that described for Example 1 in U.S. Pat. No. 5,256,231 except that the carded nonwoven web used for the preparation of the loop material was made from 6 denier polypropylene fibers. The twist peel test was carried out such that the peel front was parallel with the bond lines of the loop material. The twist peel results are given in the Table.

TABLE

| Example | Angle | 135° Twist Peel |
| --- | --- | --- |
| 3 | 0° | 1493 |
| 4 | 15° | 1344 |
| 5 | 30° | 1497 |
| 6 | 45° | 1311 |
| 7 | 60° | 891 |
| 8 | 75° | 775 |
| 9 | 90° | 955 |

The results show that twist peel values increase in going from peeling against the short axis of the caps (90°) to peeling against the long axis of the caps (0°).

Example 10

An elongated capped stem fastener was prepared in a manner similar to that described for Example 1 except that the surface of the top calender roll had a pattern of groove structures having grooves that were approximately 2.2 mils (0.056 mm) deep that were spaced 5.7 mils (0.15 mm) apart. The temperature of the top calender roll was set at approximately 135° C., and the temperature of the bottom calender roll was set at approximately 16° C. The nip gap was 16 mils (0.41 mm). The precursor web was fed through the nip one time at a line speed of 4.6 meters/minute. The resulting elongated capped stem hooks had a cap diameter in the machine direction of 18.6 mils (0.47 mm) and a cap diameter in the cross direction of 12.9 mils (0.33 mm). The height of the capped stems was 19.1 mils (0.49 mm).

Example 11

An elongated capped stem hook fastener was prepared as described in Example 10 except that the surface of the top calender roll had a pattern of groove structures having grooves that were approximately 0.86 mil (0.022 mm) deep that were spaced 1.9 mils (0.048 mm) apart. The resulting elongated capped stem hooks had a cap diameter in the machine direction of 19.6 mils (0.50 mm) and a cap diameter in the cross direction of 14.7 mils (0.37 mm). The height of the capped stems was 19.7 mils (0.50 mm).

Example 12

An elongated capped stem hook fastener was prepared in a manner similar to that described for Example 2 except that the precursor web had a stem density of 1600 stems/inch$^2$ (247 stems/cm$^2$). The height of the stems was 19 mils (0.48 mm) and the width or the diameter of the stems was 7.8 mils (0.20 mm). The backing thickness was 4.2 mils (107 microns). The precursor web was fed through the nip two times. The nip gap was 12 mils (0.31 mm) for the first pass and the nip gap was 9 mils (0.23 mm) for the second pass. The resulting elongated capped stem hooks had a cap diameter in the cross direction of 16 mils (0.41 mm) and a cap diameter in the machine direction of 11.1 mils (0.28 mm). The height of the capped stems was 15.8 mils (0.40 mm).

The capped stem hook fasteners were tested for 135 degree peel and for 135 degree twist peel using the same type of nonwoven loop material that was used for testing in Example 1. The two peel tests were carried out such that the peel front was perpendicular to the long axis of the caps. The 135 degree peel values for the elongated capped stem hook fastener averaged 210 grams/2.54 cm-width. Rounded capped stem hook fasteners having the same stem density also averaged 210 grams/2.54 cm-width. The 135 degree twist peel values for the elongated capped stem hook fastener averaged 854 grams/2.54 cm-width. Rounded capped stem hook fasteners having the same stem density averaged 880 grams/2.54 cm-width.

The capped stem hook fasteners were also tested for 135 degree peel and for 135 degree twist peel using the same type of nonwoven loop material that was used for testing in Example 2. The two peel tests were carried out such that the peel front was perpendicular to the long axis of the caps of the hook fastener and parallel to the bond lines of the loop material. The 135 degree peel values for the elongated capped stem hook fastener averaged 1426 grams/2.54 cm-width. Rounded capped stem hook fasteners having the same stem density averaged 1876 grams/2.54 cm-width. The 135 degree twist peel values for the elongated capped stem hook fastener averaged 290 grams/2.54 cm-width. Rounded capped stem hook fasteners having the same stem density averaged 149 grams/2.54 cm-width.

We claim:

1. A method for capping hook heads on a backing comprising:
   a) providing a web having a web backing with an array of substantially upstanding projections, each formed at least in part by a substantially upstanding stem base portion, the web having a first thickness;
   b) providing a nip having at least one heated surface member and at least one opposing surface member defining a gap therebetween, which has a compression zone defined by an entry gap width and an end gap width, where the entry gap width is substantially equal to or less than the first web thickness and the end gap width being substantially less than the first web thickness;
   c) providing the at least one heated surface member with at least one set of peak and groove structures longitudinally extending in at least one first direction in the compression zone, where an average spacing between adjacent peak structures is less than an average width of the stem base portions immediately adjacent a stem end portion or a hook head, and the at least one set of peak and groove structures extends longitudinally for a distance at least equal to an average distance between adjacent upstanding stem base portions; and
   d) moving the web along a web path into and through the compression zone in a second direction such that at least top portions of the array of substantially upstanding projections are preferentially deformed by the at least one heated surface member in the at least first direction defined by the at least one set of peak and groove structures, thereby capping hook heads and forming at least one set of peak and groove structures in the hook heads.

2. The method of claim 1 wherein the at least one first direction is substantially parallel with the second direction.

3. The method of claim 1 wherein there are two or more sets of peak and groove structures orientated at different directions with respect to each other defining at least two first directions.

4. The method of claim 1 wherein there are two or more sets of peak and groove structures having a substantially parallel orientation.

5. The method of claim 1 wherein an average peak to valley depth of the at least one set of peak and groove structures is from 5 to 500 microns.

6. The method of claim 5 wherein at least portions of the array of substantially upstanding projections, provided with stem distal end portions, are directionally deformed into hook heads in the compression zone by the at least one set of peak and groove structures.

7. The method of claim 1 wherein from 2 to 40 groove structures contact and deform each hook head or stem end portion.

8. The method of claim 1 wherein at least one set of peak and groove structures extends continuously across at least one heated surface member in said at least one first direction in the compression zone.

9. The method of claim 8 wherein only one set of peak and groove structures extends continuously across a portion of the compression zone that contacts the upstanding projections.

10. The method of claim 1 wherein the at least one heated surface member is moving at a first speed in the second direction and the web is moving at a second speed in the second direction.

11. The method of claim 10 wherein the first speed is substantially equal to the second speed.

12. The method of claim 10 wherein the first speed is substantially different than the second speed.

13. The method of claim 1 wherein the compression zone has two or more heated surface members.

14. The method of claim 13 wherein at least one heated surface member has no peak and groove structures.

15. The method of claim 1 wherein the array of substantially upstanding projections is formed of a thermoplastic resin.

16. The method of claim 15 wherein the array of substantially upstanding projections is formed of a polyolefin resin or blend thereof.

17. The method of claim 1 wherein the at least one heated surface member and at least one opposing surface member forming the nip are calender rolls.

18. The method of claim 1 wherein an average depth of the grooves is from 10 to 200 microns.

19. The method of claim 1 wherein the first direction is at an angle with respect to the second direction, and varies along the length of the grooves.

20. The method of claim 19 wherein the grooves are curved.

21. The method of claim 19 wherein the grooves are circular.

22. The method of claim 1 wherein the average spacing between adjacent peak structures is such that 4 to 20 grooves contact and deform the stem distal end portion or hook head.

23. The method of claim 1 wherein an average groove depth varies along the length of the grooves for a given set of peak and groove structures.

24. The method of claim 1 wherein at least one of the at least one heated surface member and at least one opposing member is curved.

25. The method of claim 1 wherein the gap width decreases continuously between the entry gap width and the end gap width.

26. The method of claim 1 wherein the gap width decreases substantially linearly in some region of the compression zone.

27. The method of claim 1 wherein at least one of the at least one heated surface member and at least one opposing surface member is a belt.

* * * * *